(12) United States Patent
Folke

(10) Patent No.: US 6,915,202 B2
(45) Date of Patent: Jul. 5, 2005

(54) METHOD AND ARRANGEMENT FOR CONTROLLING THE DRIVE UNIT OF A VEHICLE

(75) Inventor: Reiner Folke, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/431,439

(22) Filed: May 8, 2003

(65) Prior Publication Data

US 2003/0212483 A1 Nov. 13, 2003

(30) Foreign Application Priority Data

May 8, 2002 (DE) .......................................... 102 21 341

(51) Int. Cl.[7] ................................................. G06F 7/00
(52) U.S. Cl. ........................ 701/93; 701/104; 180/292
(58) Field of Search ............................... 701/1, 87, 89, 701/93, 104; 180/292

(56) References Cited

U.S. PATENT DOCUMENTS

| | | | | |
|---|---|---|---|---|
| 4,709,778 A | * | 12/1987 | von Sivers | .................. 180/292 |
| 5,476,085 A | * | 12/1995 | Becker et al. | ............... 123/685 |
| 5,839,530 A | * | 11/1998 | Dietzel | ....................... 180/65.4 |
| 5,929,533 A | * | 7/1999 | Streib | ......................... 307/10.1 |
| 6,205,973 B1 | * | 3/2001 | Bauer et al. | ................ 123/294 |
| 6,358,186 B1 | * | 3/2002 | Kosik et al. | ................. 477/176 |
| 6,611,747 B1 | * | 8/2003 | Schmitt et al. | ............... 701/84 |
| 2003/0098147 A1 | * | 5/2003 | Kemmerer et al. | |

FOREIGN PATENT DOCUMENTS

JP 358028563 A * 2/1983

* cited by examiner

Primary Examiner—Gertrude A. Jeanglaude
(74) Attorney, Agent, or Firm—Walter Ottesen

(57) ABSTRACT

A method and an arrangement for controlling a drive unit make a vehicle speed control possible wherein operating conditions not wanted by the driver are avoided. A desired quantity, which is to be outputted by the drive unit, is formed in dependence upon a pregiven vehicle speed. The desired quantity, which is to be outputted, is monitored in dependence upon at least one operating parameter of the vehicle.

20 Claims, 1 Drawing Sheet

METHOD AND ARRANGEMENT FOR CONTROLLING THE DRIVE UNIT OF A VEHICLE

BACKGROUND OF THE INVENTION

So-called vehicle speed controls are already known wherein a desired torque, which is to be outputted by the drive unit of a vehicle, is formed in dependence upon a pregiven driving speed.

SUMMARY OF THE INVENTION

The method and arrangement of the invention for controlling the drive unit of a vehicle afford the advantage with respect to the above that the desired value, which is to be outputted, is monitored in dependence upon at least one operating parameter of the vehicle. In this way, during activated vehicle speed control, unwanted operating conditions of the vehicle can be avoided by the driver.

The method of the invention is for controlling the drive unit of a vehicle and includes: forming a desired quantity to be outputted by the drive unit in dependence upon a pregiven vehicle speed; and, monitoring the desired quantity in dependence upon at least one operating parameter of the vehicle.

It is especially advantageous when the desired quantity, which is to be outputted, is limited in dependence upon the at least one operating parameter of the vehicle. In this way, avoidance of the operating conditions, which are unwanted by the driver, can be realized in an especially simple manner during active vehicle speed control.

The unwanted operating condition of the vehicle can be effectively avoided when the desired quantity, which is to be outputted, is limited in such a manner that a pregiven value is not exceeded by the at least one operating parameter of the vehicle.

A further advantage is that the pregiven value for the at least one operating parameter is derived from the previous driver behavior. In this way, it can be especially well ensured that an operating condition of the vehicle, which is not wanted by the driver, is avoided during active vehicle speed control.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
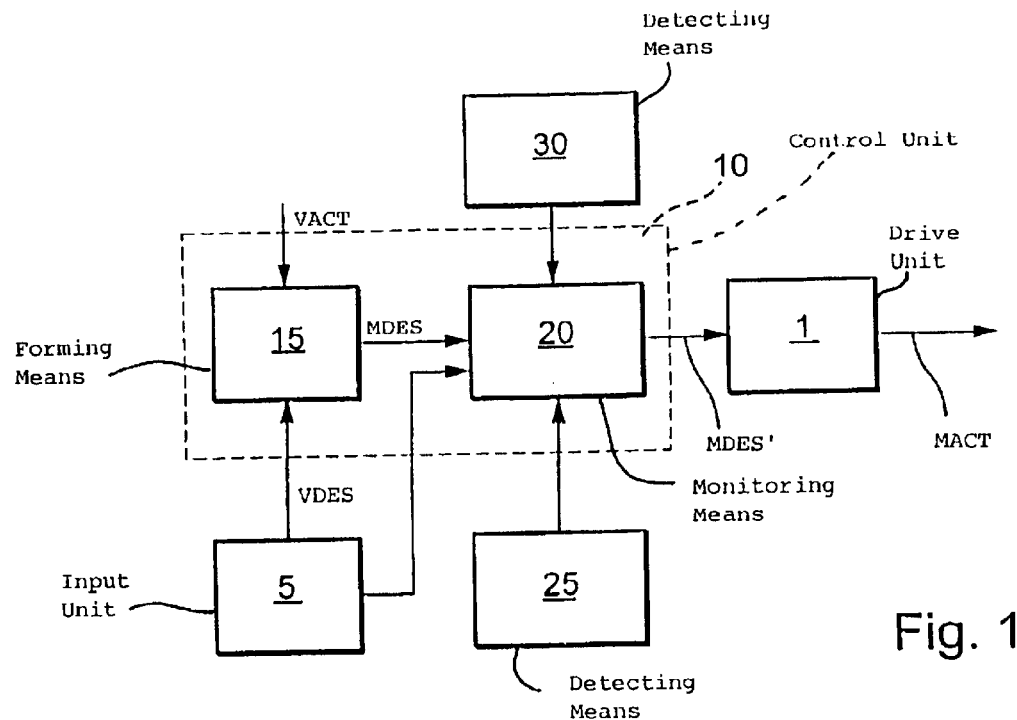
FIG. 1 is a block circuit diagram of an arrangement according to the invention; and, FIG. 2 is a sequence diagram for explaining the method of the invention.

In FIG. 1, reference numeral 1 identifies a drive unit of a vehicle which outputs an actual torque MACT to a drive shaft of the vehicle. The actual torque MACT is caused to track a desired quantity formed as desired torque MDES' which here is the effective desired torque actually to be outputted by the drive unit 1. The value for the effective desired torque MDES', which is to be outputted, is supplied to the drive unit 1 by an arrangement 10 which is referred to in the following also as the control unit. The control unit 10 includes means 15 for forming the original desired torque value MDES, which should be outputted by the drive unit 1, and means 20 for monitoring this original desired torque value MDES. For this purpose, the original desired torque value MDES is supplied by the means 15 to the means 20. The means 20 then provide the value for the effective desired torque MDES', which is to be outputted, to the drive unit 1.

According to FIG. 1, an input unit 5 can be connected to the control unit 10. As FIG. 1 shows, the input unit 5 is connected to the means 15 as well as to the means 20. The driver of the vehicle can input a desired speed value VDES at the input unit 5. The inputted desired speed value VDES is outputted to the means 15. Furthermore, the control unit 10 is connected to first detecting means 25 and to second detecting means 30. The two detecting means (25, 30) are connected to means 20. The two detecting means (25, 30) detect respective instantaneous values of an operating parameter of the vehicle different from the vehicle speed. It can here also be provided that only one detecting means for detecting an operating parameter of the vehicle or even more than two detecting means for detecting respective operating parameters of the vehicle can be provided and each is connected to the means 20.

In the following, it will be assumed by way of example that two such detecting means are provided as shown in FIG. 1.

Proceeding from the desired speed value VDES, the means 15 form the original desired torque value MDES which is required for adjusting the driving speed pregiven by the driver at input unit 5. For this purpose, the instantaneous actual speed VACT of the vehicle is also supplied to the means 15 and can be detected by a measuring device not shown in FIG. 1. The original desired torque value MDES can then be formed by the means 15 in the sense of a vehicle speed control wherein the instantaneous actual speed VACT is tracked to the desired speed value VDES. The original desired torque value MDES is monitored by the means 20 in dependence upon the operating parameter values detected by the detecting means (25, 30) and, if needed, is limited so that the effective desired torque value MDES' is outputted to the drive unit 1. An engine control (not shown in FIG. 1) of the drive unit 1 can convert the effective desired torque value MDES' into a corresponding engine power by manipulating the charge and/or the ignition in the case of a spark-ignition engine or by manipulating the injected fuel quantity in the case of a diesel engine and, in this way, cause the actual torque MACT, which is outputted by the drive unit 1, to track the effective desired torque value MDES'. In this way, the wanted speed, which is pregiven by the driver at the input unit 5, is realized, that is, the desired speed value VDES is realized.

A vehicle speed control is realized in the described manner.

Especially in vehicles having low-power engines and/or high vehicle weight (such as with recreational vehicles), with an activated drive speed control, longer phases can occur wherein the drive unit 1 is operated at its power limit at full throttle especially when traveling uphill. This is associated with a high consumption of fuel. Often, an operation at high engine rpm can occur because of the downshifting of an automatic transmission so that, additionally, a corresponding noise level occurs. Both occurrences often cause the driver to temporarily deactivate the vehicle speed control. The originally intended gain in comfort from a vehicle speed control is thereby lost in part.

According to the invention, it is provided that the original desired torque value MDES is monitored in dependence upon at least one operating parameter of the vehicle via the means 20. This monitoring, if required, can lead to limiting the original desired torque value MDES to the effective desired torque value MDES'.

A first operating parameter of the vehicle is detected in the first detecting means 25. A further operating parameter of the vehicle is detected by the second detecting means 30. For each of these two operating parameters, a pregiven value can be stored in the means 20. The means 20 limit the original desired torque value MDES to the effective desired torque value MDES' when at least one operating parameter, which is detected by the detecting means (25, 30), reaches or exceeds the pregiven value assigned to the operating parameters. The limiting of the original desired torque value MDES to the effective desired torque value MDES' takes place in such a manner that none of the operating parameters, which are detected by the detecting means (25, 30), reaches or exceeds the respective pregiven values assigned to the operating parameters. Depending upon the selection of the pregiven values for the detected operating parameters, it is ensured that operating conditions of the vehicle unwanted by the driver are avoided. The pregiven values can be inputted by the driver by means of the input unit 5 and stored in the means 20. Additionally or alternatively, it can also be provided that the pregiven values are already preset at the factory and stored in the means 20. The pregiven values can then be written over by user inputs to the input unit 5. Alternatively or additionally, it can be provided that the pregiven values for the detected operating parameters are derived from the previous driver behavior. The operating parameters, which are detected by the detecting means (25, 30), can be detected statistically especially when driving with a deactivated vehicle speed control in order to, in this way, determine an index for the values accepted by the driver for the operating parameters determined by the detecting means (25, 30). This determination can likewise take place by means 20.

Starting from such a statistic, the means 20 can adjust the pregiven values for the operating parameters of the vehicle detected by the detecting means (25, 30) in such a manner that they are exceeded as infrequently as possible. In this way, operating conditions, which are not wanted by the driver, or unwanted values for the operating parameters of the vehicle detected by the detecting means (25, 30) are detected and can be considered by the selection of suitable pregiven values for these operating parameters. The pregiven values, which are obtained in this way, are likewise stored in the means 20 and can, if required, overwrite previously inputted or preadjusted pregiven values for these operating parameters. If the pregiven values are derived from the previous driver performance as described, then this process can be continuously made current and the pregiven values for the operating parameters, which are detected by the detecting means (25, 30), are always better adapted to the driver behavior. What is furthermore advantageous here is that these pregiven values for the operating parameters can automatically be derived from the previous driver behavior so that no user input is required.

Alternatively, it can be provided that the pregiven values are fixedly preset at the factory and are stored in the means 20, for example, a ROM memory, so that they can no longer be changed later.

For the case that none of the operating parameters, which are detected by the detecting means (25, 30), reaches or exceeds the respective pregiven values assigned thereto, the effective desired torque value MDES' corresponds to the original desired torque value MDES so that the desired speed or desired speed value VDES pregiven by the driver can actually be maintained. The desired speed, which is pregiven by the driver, and therefore the desired speed value VDES are not reached for a limiting of the original desired torque value MDES to the effective desired torque value MDES' for the case that at least one parameter, which is detected by the detecting means (25, 30), has reached or exceeded the pregiven value assigned thereto.

The operating parameter of the engine, which is detected by the first detecting means 25 can, for example, be the fuel consumption. In this way, it can be ensured by the arrangement of the invention and the method of the invention that a pregiven value for the fuel consumption is not reached or exceeded with an activated vehicle speed control and, for this purpose, the original desired torque value MDES is limited as may be required and the vehicle speed is reduced to below the desired speed value VDES.

The operating parameter, which is detected by the second detecting means 30 can, for example, be the engine rpm or a noise level. In this way, it is ensured by the method of the invention and the arrangement of the invention that a pregiven value for the engine rpm or for the noise level is not exceeded and the original desired torque value MDES is limited as may be required and the vehicle speed is reduced to a value which is less than the desired speed value VDES.

For the detecting means (25, 30), suitable measuring or calculating devices are to be used which measure or calculate or estimate the fuel consumption or the engine rpm, the noise level or other suitable operating parameters in the vehicle. An imaginary accelerator pedal position would be an example for an additional operating parameter which would belong to the instantaneous operating point of the engine if the driver would himself set this operating point. The limiting then takes place, for example, to 75% of full throttle position.

With the arrangement of the invention and the method of the invention, the driver is afforded the possibility of not having a desired travel speed set at any cost; rather, the driver can include aspects of fuel consumption or noise development in his objective. Accordingly, operating conditions of the vehicle not wanted by the driver do not occur even for an activated vehicle speed control. With the method and arrangement of the invention and notwithstanding an activated vehicle speed control, an operating mode of the vehicle is realized wherein the driving performance of the vehicle in some driving situations (for example, when driving uphill) corresponds to a driving performance which a driver would select in a vehicle not having a vehicle speed control. This is, however, achieved without the driver having to repeatedly switch the vehicle speed control on and off. Rather, the vehicle speed control can remain activated continuously.

Figure 2:
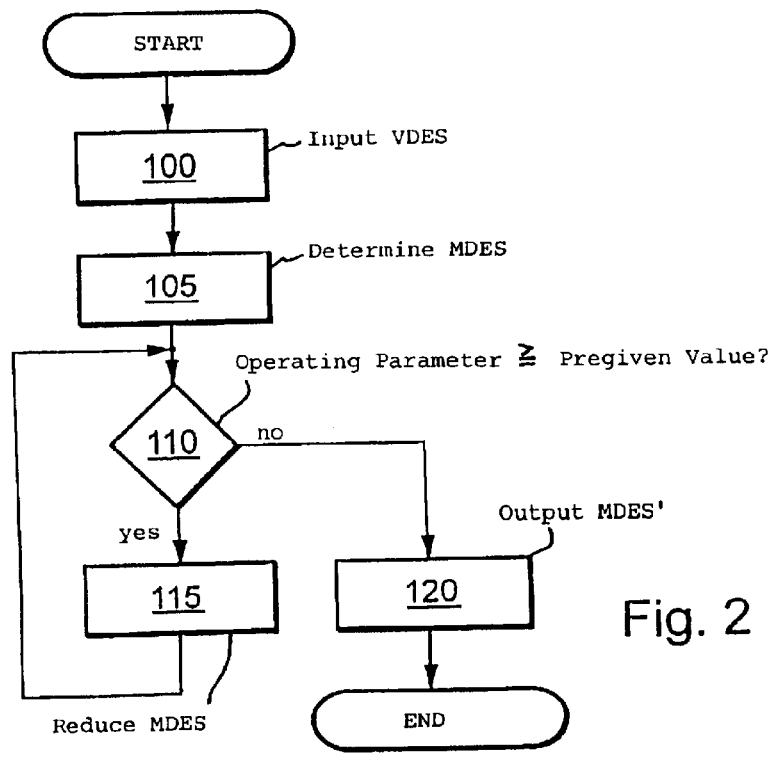

The invention will now be explained again with respect to the flowchart in FIG. 2.

At program point 100, the driver inputs a desired speed or a desired speed value VDES for the vehicle into the input unit 5. Thereafter, the program branches to program point 105. The means 15 determine the original desired torque value MDES from the desired speed value VDES at program point 105. Thereafter, the program branches to program point 110. At program point 110, the means 20 check whether at least one of the operating parameters of the vehicle, which are detected by the detecting means (25, 30), has reached or exceeds the pregiven value assigned to the operating parameter. If this is the case, then the program branches to program point 115; otherwise, the program branches to program point 120. At program point 120, the original desired torque value MDES is outputted as the effective desired torque value MDES' by the means 20 to the drive unit 1 so that a vehicle speed, which corresponds to the desired speed value VDES, can be realized by the drive unit 1. Thereafter, there is a movement out of the program. At program point 115, the original desired torque value MDES is reduced by the means 20, for example, by a pregiven torque difference value. Thereafter, there is a branching back to program point 110. In this way, the original desired torque value MDES is iteratively reduced until none of the operating parameters, which are detected by the detecting means (25, 30), reaches or exceeds the respective pregiven values assigned to the operating parameters.

As described, also only one or more than two operating parameters of the vehicle can be applied for the monitoring and, if required, the limiting of the original desired torque value MDES as a departure from the embodiment shown in FIG. 1. The monitoring and, if needed, the limiting of the original desired torque value MDES takes place in the manner described.

As a desired quantity to be outputted by the drive unit 1, also a desired power or other suitable quantity can, for example, be selected.

It is understood that the foregoing description is that of the preferred embodiments of the invention and that various changes and modifications may be made thereto without departing from the spirit and scope of the invention as defined in the appended claims.

What is claimed is:

1. A method for controlling the drive unit of a vehicle, the method comprising:

forming a desired quantity to be outputted by said drive unit in dependence upon a pregiven vehicle speed; and, monitoring said desired quantity in dependence upon at least one operating parameter of said vehicle.

2. The method of claim 1, wherein said desired quantity is a desired torque.

3. The method of claim 1, comprising the further step of limiting said desired quantity in dependence upon said at least one operating parameter of said vehicle.

4. The method of claim 3, comprising the further step of limiting said desired quantity in such a manner that a pregiven value is not exceeded by said at least one operating parameter.

5. The method of claim 4, wherein said pregiven value for said at least one operating parameter is inputted by means of an input unit.

6. The method of claim 5, wherein said pregiven value for said at least one operating parameter is preset.

7. The method of claim 6, wherein said pregiven value for said at least one operating parameter is derived from the previous driving behavior.

8. The method of claim 3, comprising the further step of limiting said desired quantity when at least one of several operating parameters reaches or exceeds a pregiven value assigned thereto.

9. The method of claim 8, wherein said pregiven value for said at least one operating parameter is inputted by means of an input unit.

10. The method of claim 9, wherein said pregiven value for said at least one operating parameter is preset.

11. The method of claim 10, wherein said pregiven value for said at least one operating parameter is derived from the previous driving behavior.

12. A method for controlling the drive unit of a vehicle, the method comprising:

forming a desired quantity to be outputted by said drive unit in dependence upon a pregiven vehicle speed; and.

monitoring said desired quantity in dependence upon at least one operating parameter of said vehicle, wherein said operating parameter is the fuel consumption.

13. The method of claim 1, wherein said operating parameter is an imaginary accelerator pedal position.

14. The method of claim 1, wherein said operating parameter is the engine rpm.

15. The method of claim 1, wherein said operating parameter is a noise level.

16. An arrangement for controlling the drive unit of a vehicle, the arrangement comprising:

means for forming a desired quantity to be outputted by said drive unit in dependence upon a pregiven vehicle speed; and, means for monitoring said desired quantity in dependence upon at least one operating parameter of said vehicle.

17. The arrangement of claim 16, wherein said desired quantity is a desired torque.

18. The method of claim 1, wherein said pregiven vehicle speed is adapted to be set by activation of a drive speed control.

19. A method for controlling the drive unit of a vehicle, the method comprising:

forming a desired quantity to be outputted by said drive unit in dependence upon a pregiven vehicle speed; and, monitoring said desired quantity in dependence upon at least one operating parameter of said vehicle which is not to be exceeded; and, limiting said desired quantity so that said operating parameter is not exceeded.

20. The method of claim 19, wherein said operating parameter is a fuel consumption which is not to be exceeded or an engine rpm which is not to be exceeded.

* * * * *